United States Patent [19]

Tuvy

[11] Patent Number: 5,719,934
[45] Date of Patent: *Feb. 17, 1998

[54] APPARATUS FOR CONNECTING AND DISCONNECTING SUBSCRIBER PREMISES LINE AND INCOMING TELEPHONE COMPANY LINE

[75] Inventor: Avraham Tuvy, Oakhurst, N.J.

[73] Assignee: Antec Corp., Rolling Meadows, Ill.

[*] Notice: The term of this patent shall not extend beyond the expiration date of Pat. No. 5,297,199.

[21] Appl. No.: 667,959

[22] Filed: Jun. 19, 1996

[51] Int. Cl.$^6$ .................................. H04M 9/00
[52] U.S. Cl. .................. 379/399; 379/412; 379/442; 439/744
[58] Field of Search .................. 379/399, 412, 379/441, 442, 387, 397; 439/744, 410, 137, 365

[56] References Cited

U.S. PATENT DOCUMENTS

| | | | |
|---|---|---|---|
| 3,624,277 | 11/1971 | Drake | 439/135 |
| 4,979,209 | 12/1990 | Collins et al. | 379/399 |
| 5,291,553 | 3/1994 | Smith | 379/399 |
| 5,297,199 | 3/1994 | Graham et al. | 379/399 |
| 5,313,519 | 5/1994 | Mickelson et al. | 379/399 |
| 5,479,505 | 12/1995 | Butler et al. | 379/412 |

*Primary Examiner*—Krista Zele
*Assistant Examiner*—Jacques M. Saint-Surin
*Attorney, Agent, or Firm*—R. Gale Rhodes, Jr.

[57] ABSTRACT

Module for being mounted to telephone network interface apparatus and for interconnecting and disconnecting a subscriber premises line to and from an incoming telephone company line and for providing a demarcation point between the lines for facilitating the determination of whether a fault exists on the subscriber premises line side of the module or on the incoming telephone company line side of the module, the module includes a base provided with a first latch, a jack provided on the base for being connected to the incoming telephone company line, subscriber terminals provided on the base for being connected to the subscriber premises line, a cover mounted pivotally to the base and provided with a second latch which is resilient and for releasably engaging the first latch to releasably latch the cover to the base upon the cover being pivoted toward said base sufficiently to engage the first and second latching means. The cover of the module may be provided with holes through which test members may be inserted to engage the subscriber terminals to test the subscriber line while the cover is closed over the base and covering the jack and subscriber terminals.

10 Claims, 4 Drawing Sheets

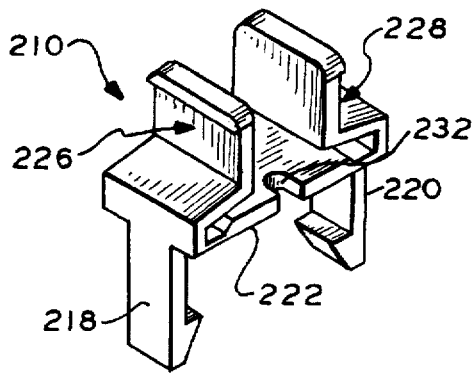
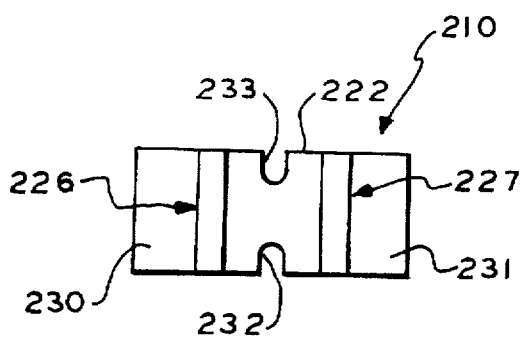
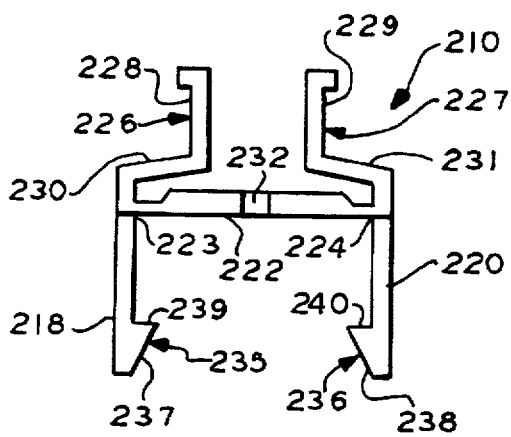
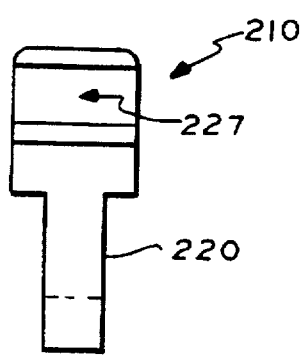
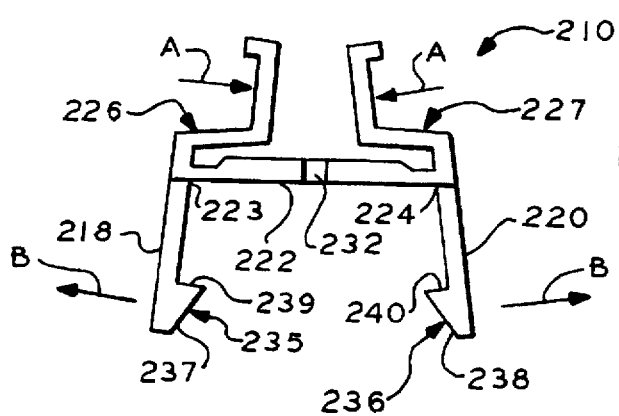

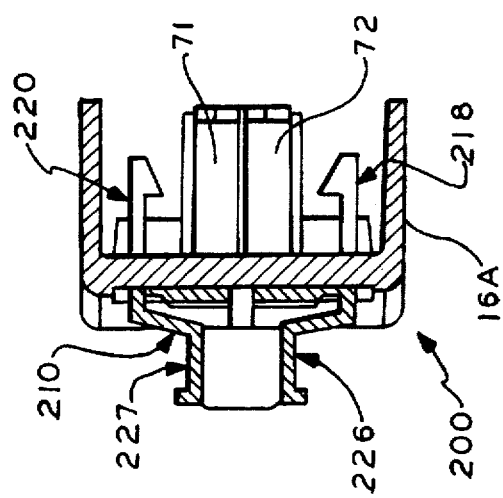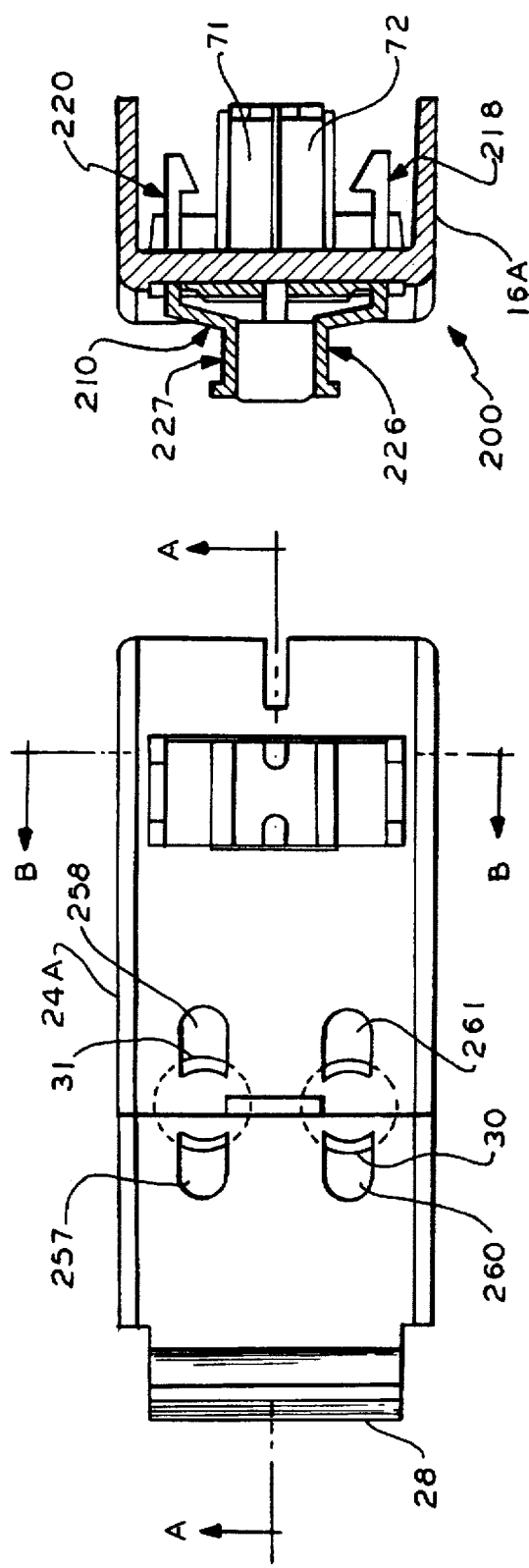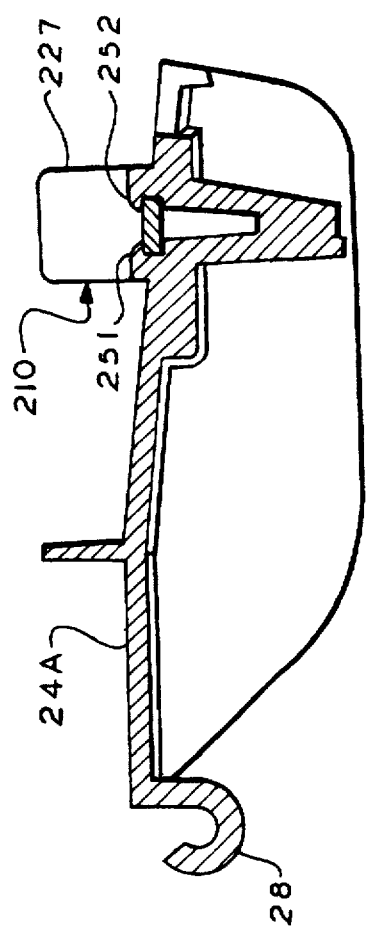

APPARATUS FOR CONNECTING AND DISCONNECTING SUBSCRIBER PREMISES LINE AND INCOMING TELEPHONE COMPANY LINE

BACKGROUND OF THE INVENTION

This invention relates generally to an improved module for being mounted to telephone network interface apparatus and for interconnecting and disconnecting a subscriber premises line from an incoming telephone line and for providing a demarcation point therebetween to facilitate determination of whether a fault exists on the subscriber premises line or on the incoming telephone company line.

More particularly, this invention relates to an improvement in the subscriber line module disclosed in U.S. Pat. No. 5,297,199 entitled APPARATUS FOR CONNECTING AND DISCONNECTING SUBSCRIBER PREMISES LINE AND INCOMING TELEPHONE COMPANY LINE, patented Mar. 22, 1994, Thomas G. Graham and Patrick J. Epple, inventors, and assigned to the same assignee as the present invention; this patent hereby is incorporated herein by reference as if fully reproduced herein and this patent is referred to hereinafter as "The '199 Patent."

Still further, this invention is an improvement in the type of module disclosed in U.S. Pat. No. 5,479,505 entitled TELEPHONE NETWORK ENCLOSURE CONTAINING PROTECTED TERMINATION DEVICE, patented Dec. 26, 1995, Walter K. Butler et al. inventors.

SUMMARY OF THE INVENTION

In an improved module for being mounted to telephone network interface apparatus and for interconnecting and disconnecting a subscriber premises line to and from an incoming telephone company line and for providing a demarcation point between the lines for facilitating the determination of whether a fault exists on the subscriber premises line side of the module or on the incoming telephone company line side of the module, the module including a base provided with first latching means, a jack provided on the base for being connected to the incoming telephone company line, subscriber terminals provided on the base for being connected to the subscriber premises line, a cover mounted pivotally to the base and provided with second latching means which are resilient latching means and are for releasably engaging the first latching means to releasably latch the cover to the base upon the cover being pivoted toward said base sufficiently to engage the first and second latching means. The cover of the module may be provided with holes through which test members may be inserted to engage the subscriber terminals to test the subscriber line while the cover is closed over the base and covering the jack and subscriber terminals.

DESCRIPTION OF THE DRAWINGS

FIG. 2 is a front view of a latching member included in the present invention;

FIG. 2A is a front view of the latching member illustrating the flexing ability of the resilient arms and resilient legs of the latching member;

FIG. 3 is a top view of the latching member shown in FIG. 2;

FIG. 4 is a right side view of the latching member shown in FIG. 2;

FIG. 5 is a perspective view of the latching member shown in FIG. 2;

FIG. 6 is a top view of the cover and latching member included in the present invention;

FIG. 7 is a cross-sectional view taken generally along the line A—A in FIG. 6 and in the direction of the arrows;

FIG. 8 is a cross-sectional view taken generally along the line B—B in FIG. 6 and in the direction of the arrows;

DESCRIPTION OF THE PREFERRED EMBODIMENT

Figure 1:
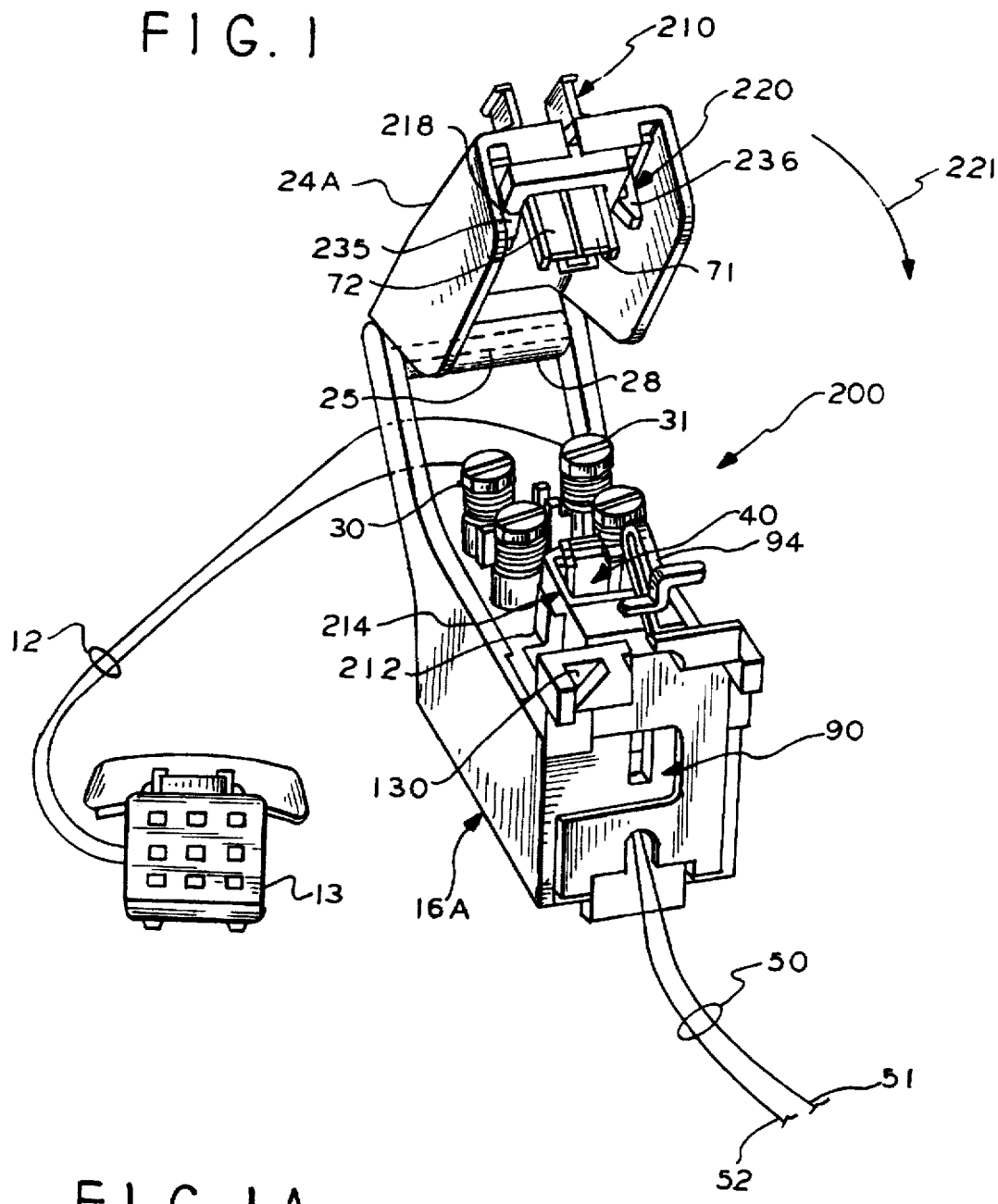
FIG. 1 is a perspective view of the module of the present invention.

Apparatus or subscriber line module embodying the present invention is illustrated in FIG. 1 and indicated by general numerical designation 200. It will be understood that the module 200, except for the structural differences described in detail below, is generally the same as the subscriber line module 10 disclosed in The '199 Patent and that the module 200 of the present invention performs substantially the same function in substantially the same way to achieve the same result as the module 10 of the '199 patent. For convenience of presentation, the structural elements of the module 200 of the present invention which are the same, or at least substantially the same, as the elements in the module 10 of The '199 Patent, are given the same numerical designations herein. It will be further generally understood that while the internal structural elements of the module 200 of the present invention are not shown in the present drawings, module 200 includes the same, or substantially the same, internal structural elements as the module 10 shown in detail in FIG. 3 of The '199 Patent and illustrated diagrammatically in FIG. 6 of The '199 Patent.

Figure 1A:
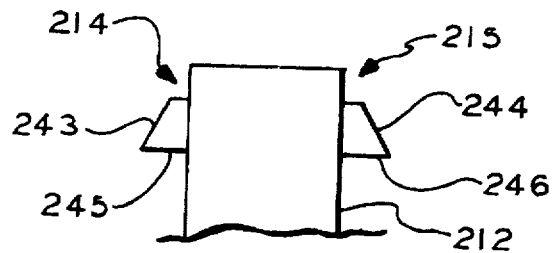
FIG. 1A is a diagrammatical illustration illustrating in detail the latching projections provided on the base included in the present invention.
Figure 10:
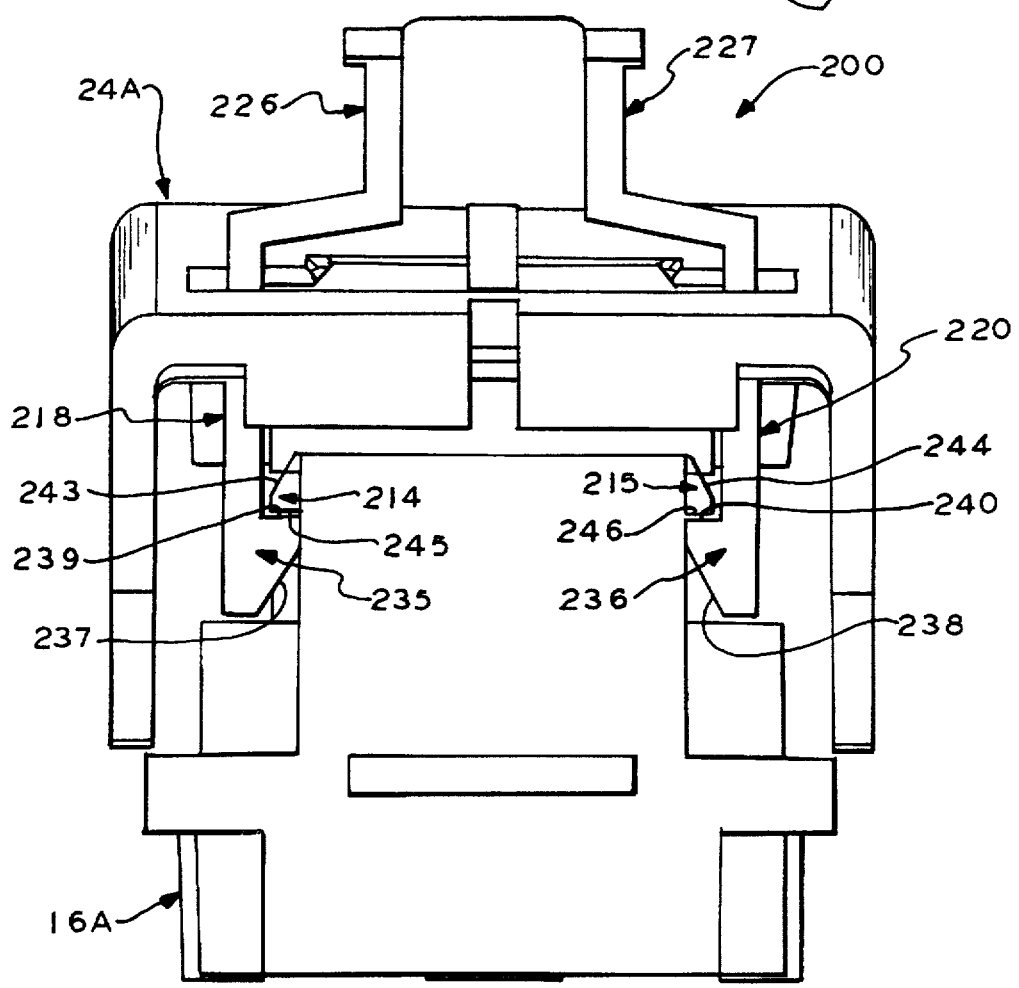
FIG. 10 is an enlarged front view of the apparatus module of the present invention illustrating in detail the manner in which the latching member releasably latches the cover to the base.

Referring now in detail to the structural differences between the module 200 of the present invention and the module 10 of The '199 Patent, and referring to FIG. 1, the cover 24A is structurally and functionally the same as the cover 24 disclosed in The '199 Patent except that cover 24A is provided with a resilient latching member indicated by general numerical designation 210. The base 16A is structurally and functionally the same as the base 6 disclosed in The '199 Patent except that the base 16A is provided with an upwardly extending portion 212 providing the jack 40 and the upwardly extending portion 212 includes a pair of opposed sides providing a pair of opposed and outwardly extending latching projections indicated by general numerical designations 214 and 215, only latching projection 214 is shown in FIG. 1 but both latching projections are shown in FIG. 10. The detailed structure of the latching projections 214 and 215 is shown in FIG. 1A. The latching projections include a pair of outwardly and downwardly inclined camming surfaces 243 and 244 terminating in a pair of opposed and spaced apart transverse or horizontally disposed latching surfaces 245 and 246. The latching member 210, FIG. 1, includes a pair of opposed and spaced apart resilient legs 218 and 220 provided with latching members 235 and 236 which, upon the cover 24 being pivoted sufficiently toward the base 16 as indicated by the curved arrow 221, engage the latching projections 214 and 215 to removably latch the cover 24A to the base 16A causing the cover to cover the jack 14 and the pair of subscriber terminals 30 and 31.

Figure 9:
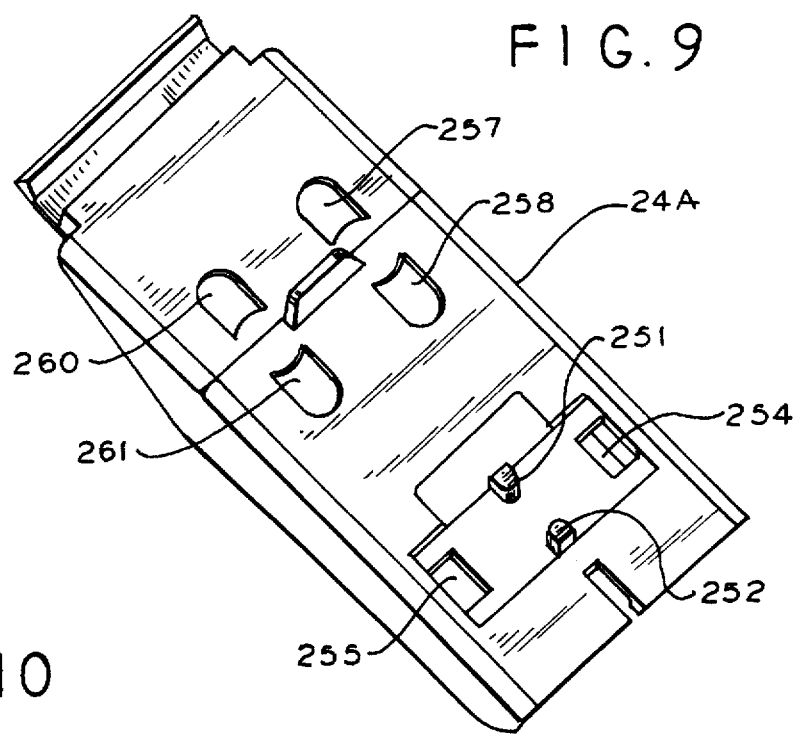
FIG. 9 is a perspective view of the cover of the present invention shown without the latching member being mounted thereto.

The detailed structure of the resilient latching member 210 is shown in FIGS. 3–5. Latching member 210 includes a transverse intermediate member 222 having a pair of opposed ends or end portions 223 and 224, a pair of opposed and spaced apart resilient arms indicated by general numerical designations 226 and 227 extending generally upwardly and inwardly from the opposed ends 223 and 224 of the transverse intermediate member 222 and the above-noted pair of opposed and spaced apart resilient legs 218 and 220 extending generally downwardly from the opposed ends 223 and 224 of member 222. The transverse intermediate member 222, the pair of resilient legs 218 and 220 and the pair of resilient arms 226 and 228 are formed integrally such as by being injection molded from a suitable resilient plastic such as polycarbonate. The central portion of the transverse intermediate member 222 is provided with a pair of opposed and inwardly extending mounting indentations 232 and 233 (FIG. 3) for receiving the mounting members or projections 251 and 252 extending upwardly from the cover 24A as shown in FIGS. 6 and 9. As shown in FIG. 2, the arms 226 and 227 include a pair of generally vertically disposed upper portions 228 and 229 and a pair of generally angularly disposed lower portions 230 and 231 extending generally inwardly and upwardly from the opposed ends 223 and 224 of the transverse intermediate member 222. Further, as shown in FIG. 2, the lower portions of the legs 218 and 220 are provided with the above-noted pair of inwardly extending latching members indicated by general numerical designations 235 and 236 including a pair of upwardly and inwardly inclined camming surfaces 237 and 238 terminating in a first pair of opposed and spaced apart transverse latching surfaces 239 and 240 disposed substantially parallel to the transverse intermediate member 222.

Referring to FIGS. 6–9, the detailed structure of the cover 24A is shown. In FIG. 9, the cover 24A is shown without the latching member 210 being mounted thereto, and it will be noted that the cover 24A in addition to the upwardly extending mounting members 251 and 252 also is provided with a pair of holes or openings 254 and 255 extending therethrough. The latching member 210 is mounted fixedly to the cover 24A by inserting the legs 218 and 220 (FIG. 2) downwardly through the holes 254 and 255 and by inserting the mounting members or projections 251 and 252 in the mounting indentations 232 and 233 (FIG. 3) after which the top portions of the mounting members or projections 251 and 252 are staked, in the manner known to the art such as by heat staking or ultrasonic staking, to cause the top portions of the mounting projections 251 and 252 to flow or mushroom inwardly and reside over portions of the transverse intermediate member 222 of the latching member 210 as shown in the cross section in FIG. 7. Upon such mounting of the latching member to the cover, the resilient arms 226 and 227 extend upwardly from the top of the cover 24A and the pair of resilient legs 218 and 220 extend downwardly from the bottom of the cover 24A as is shown generally in FIG. 1 and in detail in FIG. 8.

Referring further to FIG. 9, the cover 24A is provided with pairs of holes or openings 257 and 258 and 260 and 261 extending therethrough. As illustrated diagrammatically in FIG. 6, upon the cover 24A being pivoted and closed over the base 16A, the pair of holes 257 and 258 overlie the subscriber terminal 31 and the pair of holes 260 and 261 overlie the subscriber terminal 30. The pairs of holes 257 and 258 and 260 and 261 are sufficiently large to permit test members, such as pairs of alligator clips, to be inserted therethrough so as to mechanically and electrically engage the subscriber terminals 31 and 32 permitting the subscriber line 12, FIG. 1, to be tested while the cover 24A is fastened closed over the base 16A and the cover 24A is covering the subscriber terminals 30 and 31 and the jack 40. This is particularly beneficial since, as disclosed in The '199 Patent, the cover may be locked over the base, such as by the padlock 98 shown in FIGS. 1 and 2 of The '199 Patent, and thus, while the subscriber is away and has left the cover 24A of the module 200 locked to the base 16A, telephone company personnel can test the continuity of the telephone company line while the cover is fastened, locked, to the base. The holes 257 and 258 and 260 and 261 are sufficiently small to prevent the fingers of a person to be inserted therethrough so as to prevent the person's finger from touching the subscriber terminals 30 and 31 and possibly receiving an electrical shock.

In operation, FIG. 1, the cover 24A is pivoted downwardly, as indicated by the arrow 221, sufficiently to cause the camming surfaces 237 and 238 of the latching projections 235 and 236 of the resilient legs 218 and 220 (FIGS. 2 and 3), to engage the camming surfaces 243 and 244 of the latching projections 245 and 246 (FIG. 1A) whereupon as the cover 24 is pivoted further downwardly the camming surfaces 243 and 244 flex the resilient latching member legs 218 and 220 outwardly as indicated by the arrows B—B in FIG. 2A and as the cover 24A is pivoted further downwardly the latching surfaces 239 and 240 of the latching projections 235 and 236 (FIG. 2A) reside below the latching surfaces 245 and 246 of the latching projections 243 and 244 (FIG. 1A) whereupon, due to the resiliency of the latching member legs 218 and 220, the resilient legs flex inwardly resuming the positions shown in FIG. 2 and causing the respective latching surfaces to engage and releasably latch the cover 24A to the base 16A as shown in FIG. 10. In FIG. 10, the respective latching surfaces 239 and 240 and 245 and 246 are shown spaced apart for convenience of presentation and to prevent the lines defining these latching surfaces from overlying. To release the cover 24A from the base 16A, inwardly acting manually applied forces indicated by the arrows A—A in FIG. 2A are applied to the resilient arms 226 and 227 to flex the arms inwardly as shown in FIG. 2A which pivots the resilient legs 218 and 220 outwardly as indicated again by the arrows B—B in FIG. 2A. The resilient legs 218 and 220 are pivoted sufficiently outwardly by the inward movement of the resilient arms 226 and 227 to cause the respective latching surfaces 239 and 240 and 243 and 244 (FIG. 10) to disengage and pivot the latching projections 235 and 236 to be outwardly laterally of the latching projections 214 and 215 whereupon the cover 24A is released from the base 16A and the cover may be pivoted upwardly away from the base opposite to the direction of the arrow 221 in FIG. 1. It has been found that by providing the arms 226 and 227 of the latching member 210 with the structure shown in FIGS. 2 and 2A the inward flexing of the arms is enhanced upon application of the forces thereto indicated by the arrows A—A in FIG. 2A and the outward flexing of the legs 218 and 220 is enhanced as indicated by the arrows B—B in FIG. 2A.

It will be understood by those skilled in the art that many variations and modifications may be made in the present invention without departing from the spirit and the scope thereof.

What is claimed is:

1. In an improved module for being mounted to telephone network interface apparatus and for interconnecting and disconnecting a subscriber premises line to and from an incoming telephone company line and for providing a demarcation point between the lines facilitating determination of whether a fault exists on the subscriber premises line side of the module or on the incoming telephone company line side of the module, the module including a base, a jack provided on the base for being connected to the incoming telephone company line, subscriber terminals provided on the base for being connected to the subscriber premises line, a cover mounted pivotally to the base, latching apparatus for releasably latching the cover to the base upon the cover being pivoted closed over the base to cover the subscriber terminals and the jack,

WHEREIN THE IMPROVEMENT COMPRISES:

said cover provided with first latching means and said base provided with said second latching means, said first latching means being resilient latching means and for releasably engaging said second latching means to latch said cover to said base upon said cover being pivoted toward said base sufficiently to engage said first and second latching means.

2. In an improved module for being mounted to telephone network interface apparatus and for interconnecting and disconnecting a subscriber premises line to and from an incoming telephone company line and for providing a demarcation point between the lines facilitating determination of whether a fault exists on the subscriber premises line side of the module or on the incoming telephone company line side of the module, the module including a base, a jack provided on the base for being connected to the incoming telephone company line, subscriber terminals provided on the base for being connected to the subscriber premises line, a cover mounted pivotally to the base, latching apparatus for releasably latching the cover to the base upon the cover being pivoted closed over the base to cover the subscriber terminals and the jack,

WHEREIN THE IMPROVEMENT COMPRISES:

said cover having a top and bottom, resilient latching means mounted to said cover, said resilient latching means including a pair of resilient arms extending upwardly from said top and a pair of resilient legs extending downwardly from said bottom, said resilient arms and said resilient legs being formed integrally and said resilient legs being provided with a pair of latching members, said base provided with an upwardly extending portion providing said jack and said upwardly extending portion including a pair of latching projections for being engaged by said latching members upon said cover being pivoted sufficiently toward said base to releasably latch said cover to said base and, upon said pair of resilient arms being forced together, said pair of resilient legs being pivoted outwardly sufficiently to disengage said latching members from said latching projections permitting said cover to be pivoted away from said base.

3. In an improved module for being mounted to telephone network interface apparatus and for interconnecting and disconnecting a subscriber premises line to and from an incoming telephone company line and for providing a demarcation point between the lines facilitating determination of whether a fault exists on the subscriber premises line side of the module or on the incoming telephone company line side of the module, the module including a base, a jack provided on the base for being connected to the incoming telephone company line, subscriber terminals provided on the base for being connected to the subscriber premises line, a cover mounted pivotally to the base, latching apparatus for releasably latching the cover to the base upon the cover being pivoted closed over the base to cover the subscriber terminals and the jack,

WHEREIN THE IMPROVEMENT COMPRISES:

said latching apparatus comprising transverse intermediate member having opposed ends, a pair of opposed and spaced apart resilient arms extending generally upwardly from said opposed ends of said transverse intermediate member and a pair of opposed and spaced apart resilient legs extending generally downwardly from said opposed ends of said transverse intermediate member at said opposite ends thereof, said transverse intermediate member and said opposed arms and said opposed legs being formed integrally of resilient material, said pair of legs including bottom portions provided with a pair of inwardly extending latching members including a pair of inwardly and upwardly inclined first camming surfaces terminating in a first pair of opposed and spaced apart transverse latching surfaces substantially parallel to said transverse intermediate member;

said base provided with an upwardly extending portion providing said jack, said upwardly extending portion including a pair of opposed sides provided with a pair of opposed and outwardly extending latching projections, said latching projections including a pair of outwardly and downwardly inclined second camming surfaces terminating in a second pair of opposed and spaced apart transverse latching surfaces;

said cover provided with a pair of holes for having said pair of legs inserted downwardly therethrough to cause said pair of legs to extend generally downwardly from said cover and said pair of arms to extend generally upwardly from said cover;

said latching member and said cover provided with cooperative means for fixedly mounting said latching member to said cover; and upon said cover being pivoted sufficiently towards said base, said first and said second camming surfaces engaging to flex said pair of legs outwardly permitting said first pair of latching surfaces to be moved below said second pair of latching surfaces whereupon said pair of legs flex inwardly causing said first pair of latching surfaces and said second pair of latching surfaces to engage and releasably latch said cover to said base and, subsequently, upon said arms being forced inwardly, said legs being pivoted outwardly to move said first latching surfaces outwardly of said second latching surfaces permitting said cover to be pivoted away from said base.

4. The apparatus according to claim 3 wherein said pair of resilient arms include a pair of generally vertically disposed upper portions and a pair of generally angularly disposed lower portions extending generally inwardly and upwardly from said opposed ends of said transverse intermediate member.

5. The apparatus according to claim 3 wherein said cooperative means for fixedly mounting said latching member to said cover includes a pair of inwardly extending mounting indentations provided in said transverse intermediate member of said latching member and a pair of mounting projections extending upwardly from said cover and including upper portions, said mounting projections received within said mounting indentations and said upper portions of said mounting projections deformed inwardly over a portion of said transverse intermediate member.

6. In an improved module for being mounted to telephone network interface apparatus and for interconnecting and disconnecting a subscriber premises line to and from an incoming telephone company line and for providing a demarcation point between the lines facilitating determination of whether a fault exists on the subscriber premises line side of the module or on the incoming telephone company line side of the module, the module including a base, a jack provided on the base for being connected to the incoming telephone company line, subscriber terminals provided on the base for being connected to the subscriber premises line, a cover mounted pivotally to the base, latching apparatus for releasably latching the cover to the base upon the cover being pivoted closed over the base to cover the subscriber terminals and the jack, and subscriber premises line testing apparatus for testing the subscriber premises line while the cover is pivoted closed over the base and covering the subscriber terminals and the jack,

WHEREIN THE IMPROVEMENT COMPRISES:

said cover provided with first latching means and said base provided with said second latching means, said first latching means being resilient latching means and for releasably engaging said second latching means to latch said cover to said base upon said cover being pivoted toward said base sufficiently to engage said first and second latching means; and said cover provided with a plurality of holes overlying said subscriber terminals upon said cover being closed over the base, said holes permitting the entry therethrough of testing members for engaging the subscriber terminals to test the subscriber premises line while the cover is closed over the base and covering the subscriber terminals and jack, and said plurality of holes being sufficiently small to prevent the entry therethrough of the fingers of a person so as to prevent the fingers from touching the subscriber terminals.

7. In an improved module for being mounted to telephone network interface apparatus and for interconnecting and disconnecting a subscriber premises line to and from an incoming telephone company line and for providing a demarcation point between the lines facilitating determination of whether a fault exists on the subscriber premises line side of the module or on the incoming telephone company line side of the module, the module including a base, a jack provided on the base for being connected to the incoming telephone company line, subscriber terminals provided on the base for being connected to the subscriber premises line, a cover mounted pivotally to the base, latching apparatus for releasably latching the cover to the base upon the cover being pivoted closed over the base to cover the subscriber terminals and the jack, and subscriber premises line testing apparatus for testing the subscriber premises line while the cover is pivoted closed over the base and covering the subscriber terminals and the jack,

WHEREIN THE IMPROVEMENT COMPRISES:

said cover having a top and bottom, resilient latching means mounted to said cover, said resilient latching means including a pair of resilient arms extending upwardly from said top and a pair of resilient legs extending downwardly from said bottom, said resilient arms and said resilient legs being formed integrally and said resilient legs being provided with a pair of latching members, said base provided with an upwardly extending portion providing said jack and said upwardly extending portion including a pair of latching projections for being engaged by said latching members upon said cover being pivoted sufficiently toward said base to releasably latch said cover to said base and, upon said pair of resilient arms being forced together, said pair of resilient legs being pivoted outwardly sufficiently to disengage said latching members from said latching projections permitting said cover to be pivoted away from said base; and said cover provided with a plurality of holes overlying said subscriber terminals upon said cover being closed over the base, said holes permitting the entry therethrough of testing members for engaging the subscriber terminals to test the subscriber premises line while the cover is closed over the base and covering the subscriber terminals and jack, and said plurality of holes being sufficiently small to prevent the entry therethrough of the fingers of a person so as to prevent the fingers from touching the subscriber terminals.

8. In an improved module for being mounted to telephone network interface apparatus and for interconnecting and disconnecting a subscriber premises line to and from an incoming telephone company line and for providing a demarcation point between the lines facilitating determination of whether a fault exists on the subscriber premises line side of the module or on the incoming telephone company line side of the module, the module including a base, a jack provided on the base for being connected to the incoming telephone company line, subscriber terminals provided on the base for being connected to the subscriber premises line, a cover mounted pivotally to the base, latching apparatus for releasably latching the cover to the base upon the cover being pivoted closed over the base to cover the subscriber terminals and the jack, and subscriber premises line testing apparatus for testing the subscriber premises line while the cover is pivoted closed over the base subscriber terminals and the jack,

WHEREIN THE IMPROVEMENT COMPRISES:

said latching apparatus comprising transverse intermediate member having opposed ends, a pair of opposed and spaced apart resilient arms extending generally upwardly from said opposed ends of said transverse intermediate member and a pair of opposed and spaced apart resilient legs extending generally downwardly from said opposed ends of said transverse intermediate member at said opposite ends thereof, said transverse intermediate member and said opposed arms and said opposed legs being formed integrally of resilient material, said pair of legs including bottom portions provided with a pair of inwardly extending latching members including a pair of inwardly and upwardly inclined first camming surfaces terminating in a first pair of opposed and spaced apart transverse latching surfaces substantially parallel to said transverse intermediate member;

said base provided with an upwardly extending portion providing said jack, said upwardly extending portion including a pair of opposed sides provided with a pair of opposed and outwardly extending latching projections, said latching projections including a pair of outwardly and downwardly inclined second camming surfaces terminating in a second pair of opposed and spaced apart transverse latching surfaces;

said cover provided with a first pair of holes for having said pair of legs inserted downwardly therethrough to cause said pair of legs to extend downwardly from said cover and said pair of arms to extend upwardly from said cover and said cover provided with second and third pairs of holes overlying the subscriber terminals upon the base being closed over the base and covering the subscriber terminals and jack, said second and third pairs of holes permitting the entry therethrough of pairs of test members for testing the subscriber premises line while the cover is closed over the base to and covering the subscriber terminals and Jack, said second and third pairs of holes being sufficiently small to prevent the fingers of a person from being extended therethrough so as to prevent the fingers from touching the subscriber terminals;

said latching member and said cover provided with cooperative means for fixedly mounting said latching member to said cover; and upon said cover being pivoted sufficiently towards said base, said first and said second camming surfaces engaging to flex said pair of legs outwardly permitting said first pair of latching surfaces to be moved below said second pair of latching surfaces whereupon said pair of legs flex inwardly causing said first pair of latching surfaces and said second pair of latching surfaces to engage and removably latch said cover to said base and, subsequently, upon said arms being forced inwardly, said legs being pivoted outwardly to move said first latching surfaces outwardly of said second latching surfaces permitting said cover to be pivoted away from said base.

9. The apparatus according to claim 8 wherein said pair of resilient arms include a pair of generally vertically disposed upper portions and a pair of generally angularly disposed lower portions extending generally inwardly and upwardly from said opposed ends of said transverse intermediate member.

10. The apparatus according to claim 8 wherein said cooperative means for fixedly mounting said latching member to said cover includes a pair of inwardly extending mounting indentations provided in said transverse intermediate member of said latching member and a pair of mounting projections extending upwardly from said cover and including upper portions, said mounting projections received within said mounting indentations and said upper portions of said mounting projections deformed inwardly over a portion of said transverse intermediate member.

* * * * *